United States Patent
Tsirkin

(10) Patent No.: US 10,698,713 B2
(45) Date of Patent: Jun. 30, 2020

(54) VIRTUAL PROCESSOR STATE SWITCHING VIRTUAL MACHINE FUNCTIONS

(71) Applicant: Red Hat Israel, Ltd., Ra'anana (IL)

(72) Inventor: Michael Tsirkin, Westford, MA (US)

(73) Assignee: Red Hat Israel, Ltd., Ra'anana (IL)

( * ) Notice: Subject to any disclaimer, the term of this patent is extended or adjusted under 35 U.S.C. 154(b) by 117 days.

(21) Appl. No.: 15/363,508

(22) Filed: Nov. 29, 2016

(65) Prior Publication Data

US 2018/0150311 A1  May 31, 2018

(51) Int. Cl.
*G06F 9/455* (2018.01)

(52) U.S. Cl.
CPC ........... *G06F 9/45558* (2013.01); *G06F 2009/45562* (2013.01); *G06F 2009/45575* (2013.01); *G06F 2009/45583* (2013.01); *G06F 2009/45587* (2013.01)

(58) Field of Classification Search
CPC ... G06F 2009/4557; G06F 2009/45558; G06F 2009/45545; G06F 2009/45575
See application file for complete search history.

(56) References Cited

U.S. PATENT DOCUMENTS

| | | | |
|---|---|---|---|
| 5,987,604 A * | 11/1999 | Edrich | G06F 12/10 713/1 |
| 7,665,088 B1 | 2/2010 | Bugnion et al. | |
| 8,024,730 B2 * | 9/2011 | Campbell | G06F 21/6281 718/100 |
| 8,261,284 B2 | 9/2012 | Loeser | |
| 8,423,999 B2 | 4/2013 | Matsumoto et al. | |
| 8,429,669 B2 | 4/2013 | Moriki et al. | |
| 8,887,157 B2 * | 11/2014 | Khanna | G06F 11/1482 718/1 |
| 9,275,225 B2 | 3/2016 | Bachwani et al. | |
| 2009/0055507 A1 * | 2/2009 | Oeda | G06F 9/4856 709/216 |
| 2011/0216078 A1 * | 9/2011 | Blinzer | G09G 5/363 345/502 |
| 2013/0117743 A1 | 5/2013 | Neiger et al. | |
| 2014/0380009 A1 | 12/2014 | Lemay et al. | |
| 2015/0220406 A1 * | 8/2015 | Tsirkin | G06F 11/1484 714/15 |
| 2015/0242229 A1 | 8/2015 | van Riel et al. | |

(Continued)

OTHER PUBLICATIONS https://www.linuxplumbersconf.org./2012/wp-content/uploads/2012/09/2012-lpc-virt-intel-vt-feat-nakajima.pdf Reviewing Unused and New Features for Interrupt/APIC Virtualization, May 2012, Jun Nakajima, Intel Corporation.

(Continued)

*Primary Examiner* — James J Lee
*Assistant Examiner* — Zujia Xu
(74) *Attorney, Agent, or Firm* — K&L Gates LLP

(57) ABSTRACT

A system and method for virtual processor state switching virtual machine functions includes a memory, one or more processors, in communication with the memory, a virtual machine executing on the one or more processors, a virtual machine function executing on the virtual machine, and a hypervisor executing on the one or more processors. The hypervisor receives from the virtual machine function a request to save a state of the virtual machine function in hypervisor memory. Then, the hypervisor saves the state of the virtual machine function in the hypervisor memory.

20 Claims, 6 Drawing Sheets

(56) References Cited

U.S. PATENT DOCUMENTS

| | | | | |
|---|---|---|---|---|
| 2016/0179665 A1* | 6/2016 | LeMay | ................... | G06F 12/08 |
| | | | | 711/154 |
| 2016/0188354 A1* | 6/2016 | Goldsmith | .......... | G06F 9/45558 |
| | | | | 718/1 |
| 2016/0188413 A1* | 6/2016 | Abali | .................. | G06F 11/1438 |
| | | | | 714/15 |
| 2016/0224358 A1* | 8/2016 | Subramanian | ...... | G06F 9/45533 |
| 2017/0039120 A1* | 2/2017 | Ganesan | ............... | G06F 11/301 |
| 2017/0214544 A1* | 7/2017 | Lin | ..................... | G06F 9/45558 |

OTHER PUBLICATIONS http://ipads.se.sjtu.edu.cn/_media/publications/crossover-isca15.pdf Reducing World Switches in Virtualized Environment with Flexible Cross-World Calls, Jun. 13-17, 2015, Wenhao Li, Yubin Xia, Haibo Chen, Binyu Zang, Haibing Guan, Shanghai Key Laboratory of Scalable Computing and Systems Shanghai Jiao Tong University.

* cited by examiner

VIRTUAL PROCESSOR STATE SWITCHING VIRTUAL MACHINE FUNCTIONS

BACKGROUND

Virtualization may be used to provide some physical components as logical objects in order to allow running various software modules, for example, multiple operating systems, concurrently and in isolation from other software modules, on one or more interconnected physical computer systems. Virtualization allows, for example, consolidating multiple physical servers into one physical server running multiple virtual machines, which may increase the hardware utilization rate.

Virtualization may be achieved by running a software layer, often referred to as a hypervisor, above the hardware and below the virtual machines. A hypervisor may run directly on the server hardware without an operating system beneath it or as an application running on a traditional operating system. A hypervisor may virtualize the physical layer and provide interfaces between the underlying hardware and virtual machines. Processor virtualization may be implemented by the hypervisor scheduling time slots on one or more physical processors for a virtual machine, rather than a virtual machine actually having a dedicated physical processor.

SUMMARY

The present disclosure provides a new and innovative system, methods and apparatus for virtual processor state switching virtual machine functions. In an example, a system includes a memory, one or more processors, in communication with the memory, a virtual machine executing on the one or more processors, a virtual machine function executing on the virtual machine, and a hypervisor executing on the one or more processors. The hypervisor receives from the virtual machine function a request to save a state of the virtual machine function in hypervisor memory. Then, the hypervisor saves the state of the virtual machine function in the hypervisor memory.

Additional features and advantages of the disclosed method and apparatus are described in, and will be apparent from, the following Detailed Description and the Figures.

DETAILED DESCRIPTION OF EXAMPLE EMBODIMENTS

Figure 1:
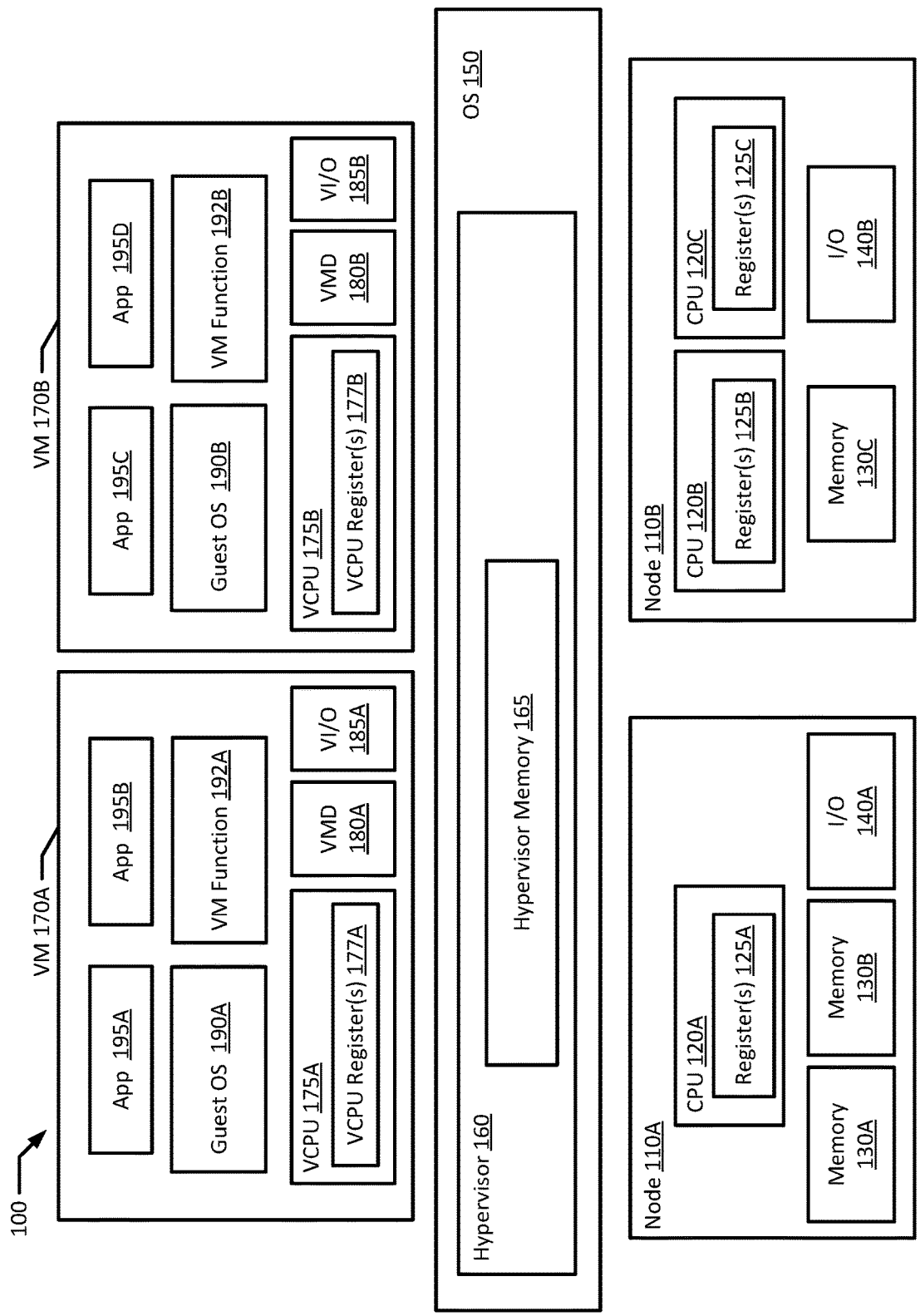
FIG. 1 is a block diagram of an example computer system according to an example of the present disclosure.

Described herein are methods and systems for virtual processor state switching virtual machine functions. A virtual machine function may be used for improving performance and security for virtual systems. Using the virtual machine function, a hypervisor may prevent a virtual machine guest's access to resources of a host operating system or other virtual machine guests unless the virtual machine guest is using a virtual machine function. The hypervisor may also prevent the guest's access to the virtual machine function unless the guest is executing a specific instruction (e.g., VMFUNC or a hypercall). On x86 processors, virtual machine functions may be implemented using extended page table ("EPT") switching. For example, an extended page table is selected depending on whether a virtual machine function is used. If the virtual machine function is not used, a default EPT (e.g., an unprivileged table) for a guest is selected. If the virtual machine function is used, an alternative EPT (e.g., a privileged table) for the virtual machine function is selected.

Unfortunately, there may be multiple problems with the approach described above. A guest may be capable of bypassing security protections by triggering the execution of the virtual machine function. For example, injecting interrupts into a virtual machine function, which does not have an interrupt handler, while the virtual machine function is executing may cause one or more virtual machines, host operating systems, or guest operating systems to crash, for example, if an interrupt data structure points to code in memory that adversely affects execution of code for the virtual machine function. Also, if a virtual machine has access to more than one page of privileged memory when a guest has access to page tables that translate guest virtual addresses into guest physical addresses, then the guest could maliciously or inadvertently corrupt or confuse the virtual machine function. For example, a change to an entry of the page table by a guest may reorder pages so that malicious code is executed while the guest has access to privileged pages, or that privileged access is granted for the wrong pages. In another example, if a virtual machine function is designed to run in a 32 bit mode, executing the virtual machine function in a 64 bit mode may cause it to operate in unexpected ways.

Aspects of the present disclosure may address the above noted deficiency. In an example, during initialization of a guest, the guest may execute virtual machine function set up code. Once the virtual machine function having virtual machine function initialization code is set up, the guest may send a request to execute the virtual machine function initialization code that is configured, when executed, to send a request to a hypervisor to save the current state of the virtual machine function, which is in a known good state free of any manipulation. Once the request is received, the hypervisor may save the virtual machine function state in hypervisor memory, for example, by executing one or more instructions (e.g., a VMCLEAR instruction or a series of VMREAD instructions).

When the guest sends a request to the hypervisor to switch to the virtual machine function, the hypervisor may save a current state of the guest in the hypervisor memory, for example, by executing one or more instructions (e.g., VMCLEAR instruction or VMREAD instruction). If there is an update or modification to the guest state (e.g., VCPU state) that needs to be passed to the virtual machine function state, the hypervisor may save this update or modification in a register (or any other place in the computer system). Then, the hypervisor may pass the saved guest state update or modification (e.g., update/modification to the VCPU state) to the virtual machine function, for example, by writing a value of the register to the hypervisor memory prior to switching to the virtual machine function. That is, the value in the register regarding the guest state may be written to a location in the hypervisor memory 165 having the virtual machine function state information. In this way, the updated/modified guest state (e.g., VCPU state of the guest) may become part of the virtual machine function state (e.g., VCPU state of the virtual machine function).

In an example, the hypervisor may pass the update or modification to the guest state to a virtual machine function state area in a Virtual Machine Control Structure (VMCS). In this way, the virtual machine function may be able to access the changed state (e.g., changed VCPU state of the virtual machine function) normally because the change is now part of the VCPU state of the virtual machine function.

Then, the hypervisor may load the saved state of the virtual machine function, which is in a known good state without any security risk, from the hypervisor memory, for example, by executing a launch instruction (e.g., VMLAUNCH instruction), or one or more write instructions (e.g., VMWRITE instructions) and a resume instruction (e.g., VMRESUME instruction). Then, the guest may request the switch to the virtual machine function by executing a virtual machine function code (e.g., VMFUNC or a hypercall).

Then, once the execution of the virtual machine function is completed, the hypervisor may save the state of the virtual machine function in the hypervisor memory. If there is an update or modification to the virtual machine function state (e.g., VCPU state) that needs to be passed to the guest, the hypervisor may save this update or modification in a register (or any other place in the computer system). Then, the hypervisor may pass the saved virtual machine function state update or modification (e.g., update/modification to the VCPU state) to the guest, for example, by writing a value of the register to the hypervisor memory prior to switching to the guest. That is, the value in the register regarding the virtual machine function state may be written to a location in the hypervisor memory having the guest state information. In this way, the updated/modified virtual machine function state (e.g., VCPU state of the virtual machine function) may become part of the guest state (e.g., VCPU state of the guest).

In an example, the hypervisor may pass the update or modification to the virtual machine function state to a guest state area in the VMCS. In this way, the guest may be able to access the changed state (e.g., changed VCPU state of the gest) normally because the change is now part of the VCPU state of the guest. Then, the hypervisor may load the saved state of the guest from the hypervisor memory, for example, by executing a launch instruction (e.g., VMLAUNCH instruction), or one or more write instructions (e.g., VMWRITE instructions) and a resume instruction (e.g., VMRESUME instruction). Then, the hypervisor may switch to the guest from the virtual machine function.

In an example, rather than passing the updated guest state or updated virtual machine function state when switching, the hypervisor may avoid over-writing the changed guest/virtual machine function state, or register or any locations having the guest state update or virtual machine function update by using VMREAD/VMWRITE instructions. By using the VMREAD/VMWRITE instructions, the hypervisor may skip the restoration of the updated/modified part of the guest state or the virtual machine function state when switching. For example, when switching from the guest to the virtual machine function, by executing a write instruction (e.g., VMWRITE instruction), the hypervisor may skip the restoration of the guest state update (e.g., VCPU state of the guest), and, thus, the guest state update may be part of the virtual machine function state (e.g., VCPU state of the virtual machine function) after the switch.

In this way, the system can keep the virtual machine function and the guest in a known good state free of any manipulation by saving and loading the virtual machine function state and the guest state since the guest initialization. Also, if there is an update to the guest state or the virtual machine function state that needs to be passed, this can be updated by using a register in the guest state or the virtual machine function state. Instead of resolving the security issues on a case-by-case basis (e.g., checking whether interrupts are disabled while the virtual machine function is executing to prevent the injection of the interrupts into the virtual machine function, or validating guest page tables before enabling the virtual machine function to prevent virtual machine function corruption by a malicious guest), the present disclosure provides more comprehensive solutions, which may be capable of preventing not only known threats, but also other unknown potential security threats in using virtual machine functions, by saving and loading the states of the virtual machine function and the guest since the guest initialization. Additional features and advantages of the disclosed method, system, and apparatus are described below.

FIG. 1 depicts a high-level component diagram of an example multi-processor computer system 100 in accordance with one or more aspects of the present disclosure. The computer system 100 may include one or more interconnected nodes 110A-B. Each node 110A-B may in turn include one or more physical processors (e.g., CPU 120A-C) communicatively coupled to memory (e.g., memory 130A-C) and input/output devices (e.g., I/O 140A-B).

As used herein, physical processor or processor 120A-C refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). In an example, the processor 120 A-C may include one or more registers 125A-C. The one or more registers 125A-C may be a general register (e.g., RAX) or a control register (e.g., IDTR or CR3).

As discussed herein, a memory device 130A-C refers to a volatile or non-volatile memory device, such as RAM, ROM, EEPROM, or any other device capable of storing data. As discussed herein, I/O device 140A-B refers to a device capable of providing an interface between one or more processor pins and an external device capable of inputting and/or outputting binary data. The memory device 130A-C may be divided into units referred to as pages. A page is a specific amount of contiguous memory that represents the smallest unit in which an operating system allocates for various purposes. A page of memory is a set range of addresses to which data can be stored. The operating system may swap pages from working memory to longer term storage such as a non-volatile storage. The pages in host memory (e.g., 130A-C) may correspond to Host Physical Addresses (HPAs). The HPAs may be allocated for use by the host machine, the hypervisor 160, or one of the virtual machines 170A-B.

Processors 120A-C may be interconnected using a variety of techniques, ranging from a point-to-point processor interconnect, to a system area network, such as an Ethernet-based network. Local connections within each node 110A-B, including the connections between a processor 120A and a memory device 130A-B and between a processor 120A and an I/O device 140A may be provided by one or more local buses of suitable architecture, for example, peripheral component interconnect (PCI). As used herein, a device of the OS 150, which may be referred to as a host device, may refer to CPU 120A-C, Memory 130A-C, I/O 140A-B, a software device, and/or hardware device.

As noted above, computer system 100 may run multiple virtual machines (e.g., VM 170A-B), by executing a software layer (e.g., hypervisor 160) above the hardware and below the virtual machines 170A-B, as schematically shown in FIG. 1. In an example, the hypervisor 160 may be a component of the host operating system 150 executed by the computer system 100. In another example, the hypervisor 160 may be provided by an application running on the operating system 150, or may run directly on the computer system 100 without an operating system beneath it. The hypervisor 160 may virtualize the physical layer, including processors, memory, and I/O devices, and present this virtualization to virtual machines 170A-B as devices, including virtual processors (e.g., VCPU 175A-B), virtual memory (e.g., VMD 180A-B), and/or virtual I/O devices (e.g., VI/O 185A-B). The hypervisor 160 is provided with some memory referred to as hypervisor memory 165. Hypervisor memory 165 may correspond to physical pages in host memory 130A-C. Thus, a subset of the pages in host memory 130A-C may be specifically allocated for use by the hypervisor 160. The hypervisor 160 can use this memory to perform various tasks related to management of the virtual machines 170A-B.

In an example, a virtual machine 170A-B may execute a guest operating system 190A-B which may utilize the underlying VCPU 175A-B, VMD 180A-B, and VI/O devices 185A-B. One or more applications 195A-D may be running on a virtual machine 170A-B under the guest operating system 190A-B. In an example, a device may be a device (e.g., VCPU 175A-B, VMD 180A-B, VI/O devices 185A-B, virtual device 172A-B, etc.) of a guest operating system 190A-B, and which may be referred to as a guest device.

In an example, the guest memory (e.g., VMD 180A-B) may be represented by Guest Virtual Addresses (GVAs) and Guest Physical Addresses (GPAs). The hypervisor 160 may map HPAs to GPAs. Specifically, a page of host memory 130A-C is mapped to a page of guest memory (180A-B) identified by GPAs. A host page table is used to maintain this mapping. Each entry in the host page table provides a mapping from a GPA to an HPA. Similarly, the guest maps pages identified by GVAs to pages of GPAs by using a guest page table to maintain this mapping. The GVAs are provided to various applications that run on the guest.

In an example, a virtual machine 170A-B may include multiple virtual processors (VCPU) 175A-B. Processor virtualization may be implemented by the hypervisor 160 scheduling time slots on one or more physical processors 120A-C such that from the guest operating system's perspective those time slots are scheduled on a virtual processor 175A-B. In an example, each virtual processor 175A-B may include one or more VCPU registers 177A-B. In an example, the VCPU register 177A-B is a guest device register. In an example, a VCPU register 177A-B may be a command register or a base address register (BAR). In an example, a VCPU register 177A-B may include any known register used in the peripheral component interconnect (PCI) configuration space. In an example, a base address register (BAR) includes a base address (or start address) of the guest device at which a memory region of the host device, which corresponds to the guest device, can be accessed and further includes a size indicator that denotes the size of the memory region of the host device.

In an example, the VCPU register 177A-B may include a guest state. As used herein, the term "guest state" may refer to a state in which the system is operating in guest mode. For example, the guest state may include information about GVAs, GPAs, guest page tables mapping the GVAs to the GPAs, unprivileged page tables mapping the GPAs to the HPAs, unprivileged page views of the guests, and/or access status of the virtual machines 170A-B in the unprivileged page views or the unprivileged page tables. In an example, the guest state may be a virtual machine state having a VCPU state. In an example, the VCPU register 177A-B may include a virtual machine function ("VM Function") state. As used herein, the term "VM Function state" may refer to a state in which the system is operating in VM Function mode. For example, the VM Function state may include information about privileged page tables of the VM Function 192A-B, privileged page views of the VM Function 192A-B, access status of the VM Function 192A-B in the privileged page views or the privileged page tables, or any processor state when the computer system is in the VM Function mode. In an example, the VM Function state may also include a state (or value) of a register 125A-C.

In an example, the hypervisor 160 may provide one or more VM Functions 192A-B to a virtual machine 170A-B. The code that a VM Function 192A-B runs on the physical processor(s) 120A-C may utilize the resources of operating system (OS) 150, such as the memory 130A-C, and the input/output devices 140A-B, as well as the resources of one or more of the virtual machines 170A-B including the virtual processors 175A-B, the virtual memory 180A-B, and the virtual I/O devices 185A-B. For example, the VM Function 192A may be called by a VM 170A to transfer data to, or to access the resources, of the OS 150 or another VM 170B. By contrast, each VM 170A may be limited to the use of its own resources including its VCPUs 175A, virtual memory 180A, and virtual I/O device 185A unless it invokes a VM Function 192A as described below.

In an example, the VM Function 192A-B may be invoked for a VM 170A-B, by the guest OS 190A-B that is running on the VM 170A-B. In an example, a VM Function 192A-B may only be invoked if hypervisor 160 provides access or grants a request. For example, a VM 170A or guest OS 190A may invoke a VM Function 192A to handle a task more efficiently or using greater resources than are presently available to the VM 170A or guest OS 190A. In an example, a hypervisor 160 may grant a VM 170A or guest OS 190A access to a VM Function 192A to allow the VM 170A or guest OS 190A to access a resource without requiring an exit to the hypervisor 160. In an example, the hypervisor 160 may also deny the request by causing an undefined opcode exception or a general protection fault exception whenever the VM Function 192A is invoked.

Figure 2:
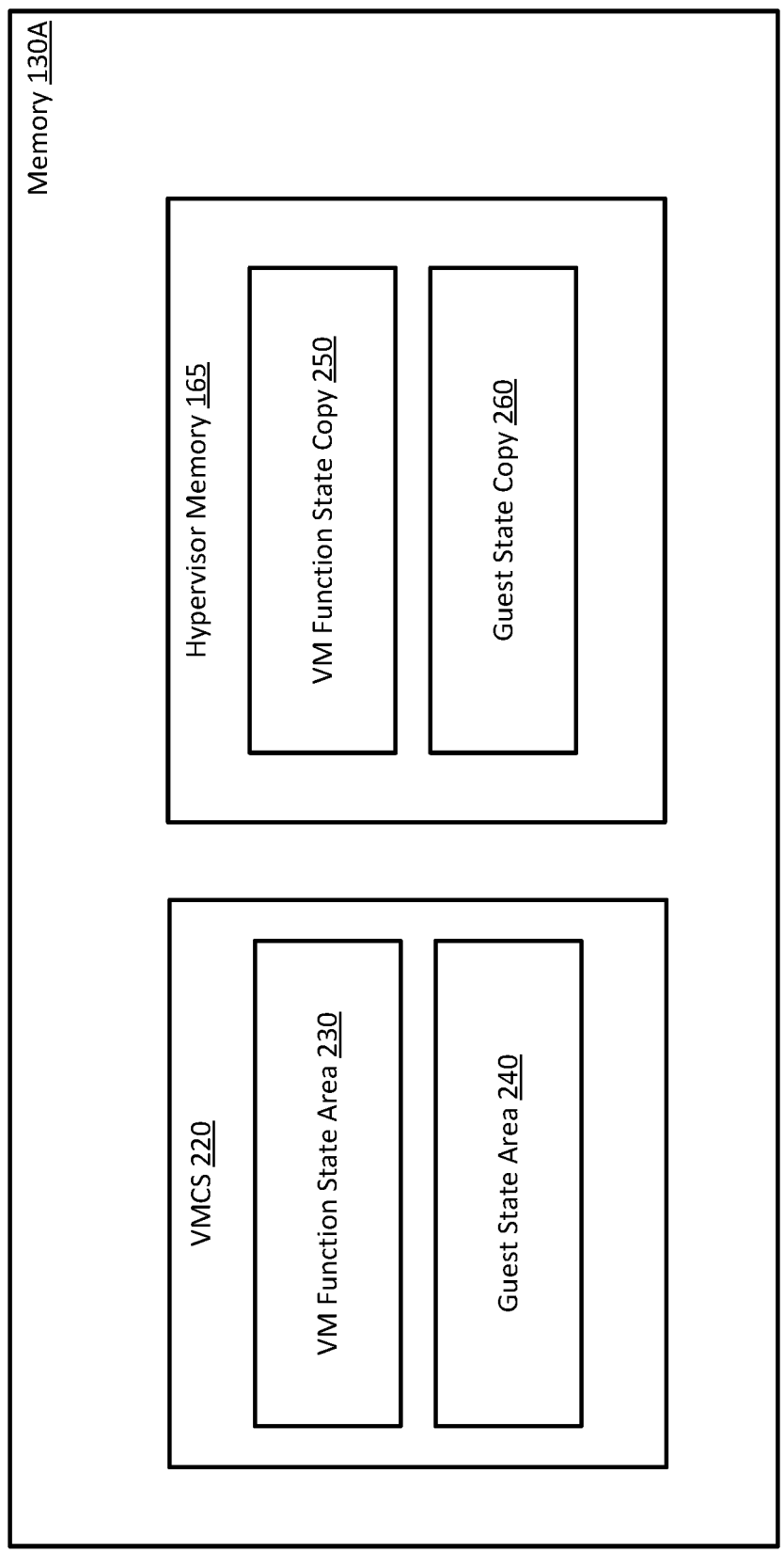
FIG. 2 is a block diagram of an example memory according to an example of the present disclosure.

FIG. 2 illustrates an example of memory 130A. The memory 130A may include a Virtual Machine Control Structure (VMCS) 220, which is a data structure stored in memory. The VMCS 220 may include CPU state. For example, the VMCS 220 may include data that defines the state of a VCPU 175A-B. In an example, the VMCS 220 may include a VM Function state area 230 and a guest state area 240. The VM Function state area 230 may include the VM Function state and the guest state area 240 may include the guest state. In an example, the VM Function state in the VM Function state area 230 may be not visible to the guest, while the guest state in the guest state area 240 may be visible to the guest. As used herein, a guest may refer to any software running within the virtual machines (e.g., VM 170A-B), such as guest operating systems (e.g., guest OS 190A-B) and/or applications running on the guest operating systems (e.g., Applications 195A-D), and/or may refer to guest firmware running within the virtual machines (e.g., VM 170A-B). The memory 130A may also include hypervisor memory 165. The hypervisor memory 165 may include a first location 250 and a second location 260. The first location 250 may include a copy of the VM Function state and the second location 260 may include a copy of the guest state. In an example, the first location 250 of the hypervisor memory 165 may maintain a copy of all or parts of the VM Function state stored in the VM Function State Area 230. In an example, the second location 260 of the hypervisor memory 165 may maintain a copy of all or parts of the guest state stored in the Guest State Area 240. In an example, the VMCS 220 may be in the hypervisor memory 165. In another example, the VMCS 220 may be separate from the hypervisor memory 165. The present disclosure is not limited to the structure of the system illustrated in FIG. 2.

Figure 3:
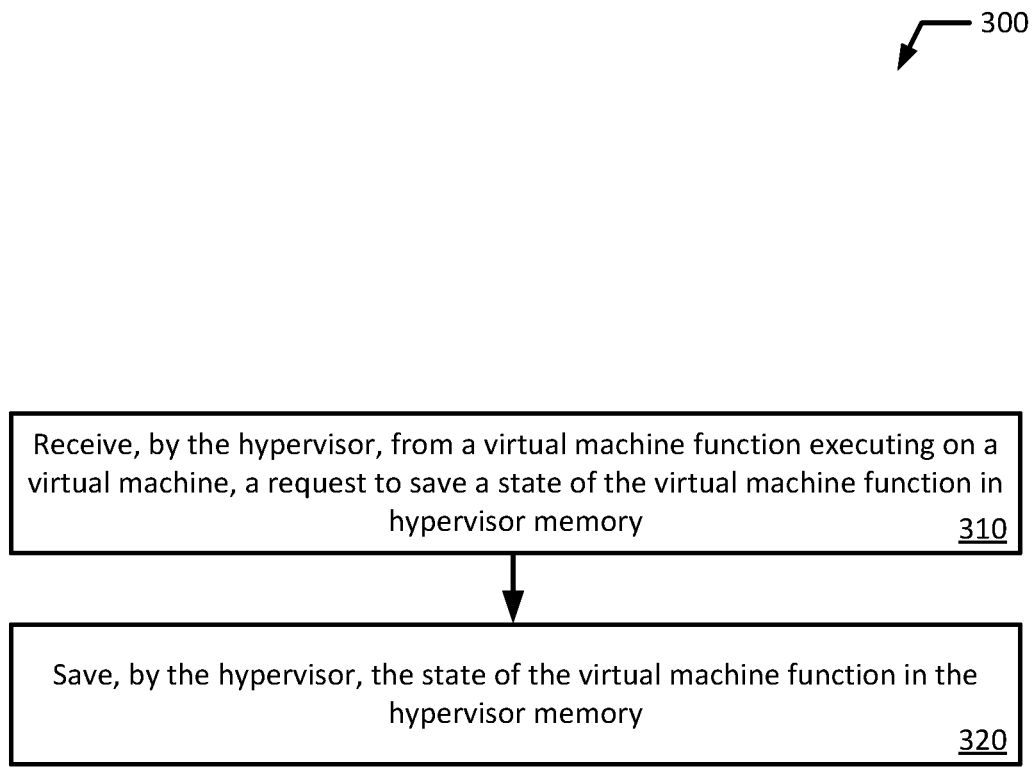
FIG. 3 is a flowchart illustrating an example process for virtual processor state switching virtual machine functions according to an example of the present disclosure.

FIG. 3 shows a flowchart of an example method 300 for virtual processor state switching virtual machine functions. Although the example method 300 is described with reference to the flowchart illustrated in FIG. 3, it will be appreciated that many other methods of performing the acts associated with the method may be used. For example, the order of some of the blocks may be changed, certain blocks may be combined with other blocks, and some of the blocks described are optional.

In the illustrated example, a hypervisor may receive from a virtual machine function executing on a virtual machine a request to save a state of the virtual machine function in hypervisor memory (block 310). For example, the hypervisor 160 may receive from the VM Function 192A a request to save a state of the VM Function 192A in the hypervisor memory 165. In an example, initialization code, when executed, may cause the VM Function to send a request to save the state of the VM Function 192A in the hypervisor memory 165. Then, the hypervisor may save the state of the virtual machine function in the hypervisor memory (block 320). For example, responsive to receiving the request, the hypervisor 160 may save the state of the VM Function 192A in the hypervisor memory 165.

Figure 4A:
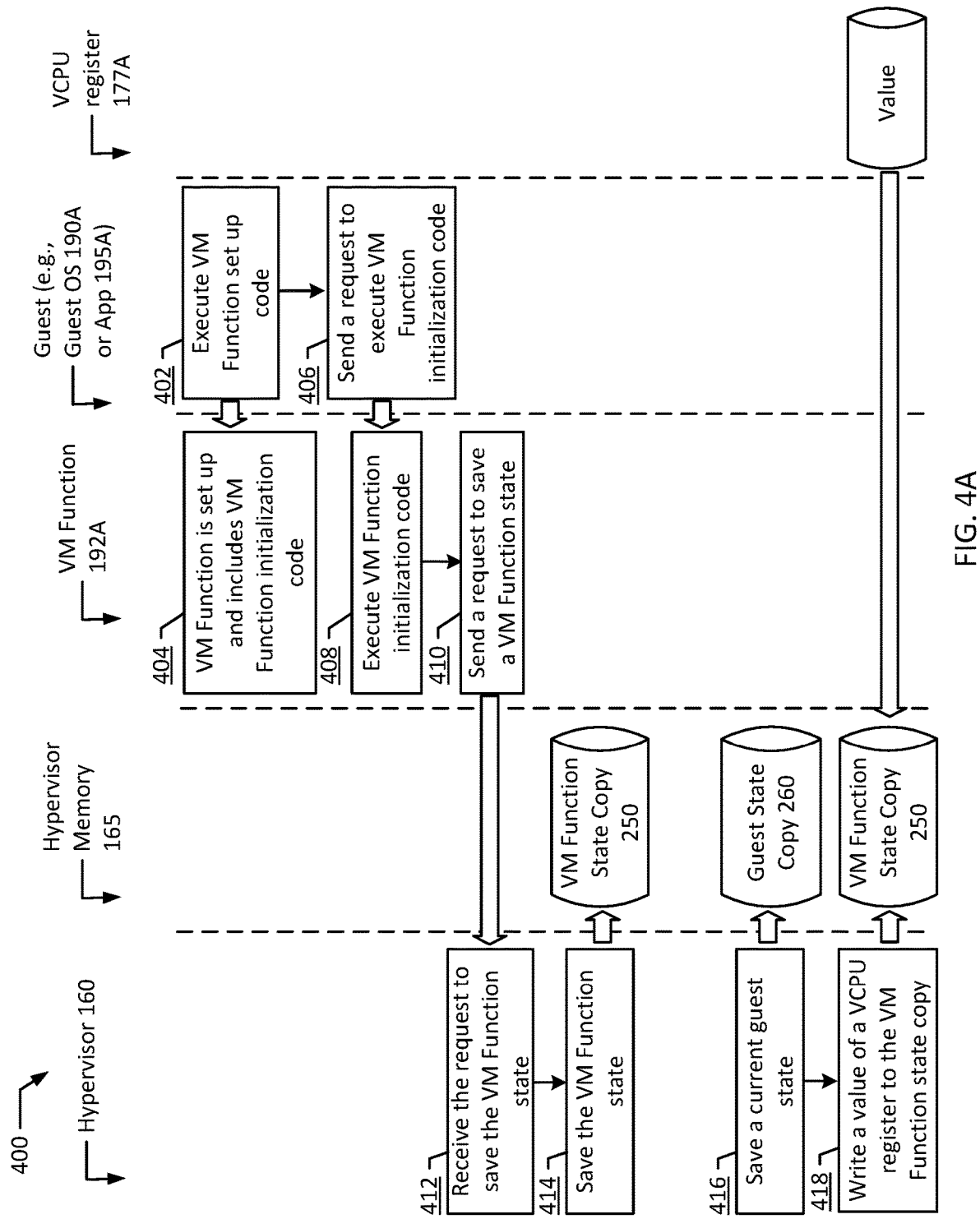
FIGS. 4A and 4B are flow diagrams illustrating an example process for virtual processor state switching virtual machine functions according to an example of the present disclosure.
Figure 4B:
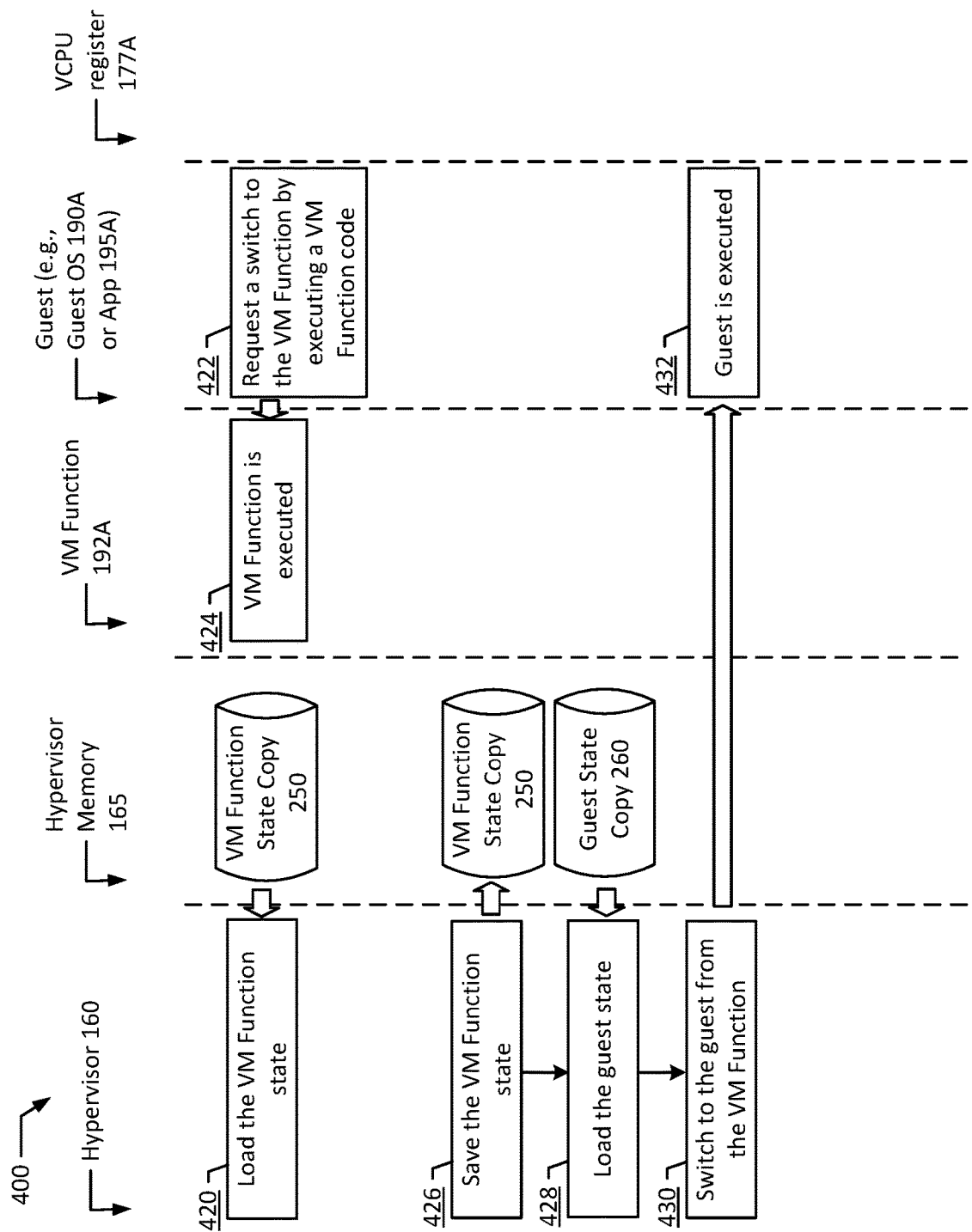

FIGS. 4A and 4B illustrate flow diagrams of an example method 400 for virtual processor state switching virtual machine functions according to an example of the present disclosure. Although the example method 400 is described with reference to the flow diagrams illustrated in FIGS. 4A and 4B, it will be appreciated that many other methods of performing the acts associated with the method may be used. For example, the order of some of the blocks may be changed, certain blocks may be combined with other blocks, and some of the blocks described are optional. The method 400 may be performed by processing logic that may include hardware (circuitry, dedicated logic, etc.), software, or a combination of both.

In the illustrated example, a guest (e.g., guest OS 190A, guest firmware, and/or Applications 195A-B) may execute VM Function set up code (block 402). In an example, the guest may execute the VM Function set up code during the initialization of the guest. Then, the VM Function 192A having VM Function initialization code may be set up (block 404). Then, the guest may send a request to execute the VM Function initialization code (block 406). In response to the request, the VM Function 192A may execute the VM Function initialization code (block 408). The VM Function 192A may send a request to the hypervisor 160 to save a state of the VM Function 192A (block 410). The hypervisor 160 may receive the request to save the state of the VM Function 192A (block 412). Then, the hypervisor 160 may save the VM Function state in a first location 250 of the hypervisor memory 165 (block 414). For example, the hypervisor 160 may save a copy of the VM Function state in the first location 250. In an example, the state of the VM Function 192A may be saved in the VMCS 220 (e.g., VM Function state area 230) first and then the hypervisor 160 may copy the VM Function state from the VMCS 220 to the hypervisor memory 165 (e.g., the first location 250).

In an example, the initialization code may include VM Function save state code that is configured, when executed, to cause a copy of the state of the VM Function 192A to be saved in the hypervisor memory 165. In an example, the virtual machine function save state code is configured, when executed, to cause a copy of the state of the VM Function 192A to be saved in the hypervisor memory 165 by sending a request to the hypervisor 160, which causes the hypervisor 160 to execute an instruction (e.g., VMCLEAR instruction or a series of VMREAD instructions) to ensure data corresponding to the state of the VM Function 192A has been written to the hypervisor memory 165. In an example, the initialization code may be configured, when executed, to invoke a hypercall requesting the hypervisor 160 to save the current VM Function state.

In an example, the guest may be switched to the VM Function 192A. Prior to switching to the VM Function 192A, the hypervisor 160 may save a current state of the guest (e.g., guest OS 190A, guest firmware, and/or Applications 195A-B) in a second location 260 of the hypervisor memory 165 (block 416). In an example, the state of the guest may be saved in a location in the VMCS 220 (e.g., guest state area 240), for example, by executing the VMCLEAR instruction, and the hypervisor 160 may copy the guest state from the VMCS 220 to the hypervisor memory 165.

In an example, the initialization code may further include guest save state code. In an example, the guest save state code may be configured, when executed, to cause the hypervisor 160 to execute an instruction (e.g., VMCLEAR instruction) to ensure data corresponding to the guest state has been written to the hypervisor memory. In another example, the guest save state code may be configured, when executed, to cause the hypervisor 160 to execute one or more read instructions (e.g., VMREAD instruction) to save a copy of a guest state in the hypervisor memory 165. In an example, the hypervisor 160 may save the current state of the guest in the hypervisor memory 165 (e.g., second location 260) prior to switching to the VM Function 192A.

In an example, the hypervisor 160 may write a value of a VCPU register 177A to the first location 250 of hypervisor memory 165 (block 418). For example, the hypervisor 160 may pass guest state information in a register 177A from the guest to the VM Function 192A by writing a value of the register 177A to the hypervisor memory 165 prior to switching to the VM Function 192A. That is, the value in the VCPU register 177A regarding a guest state may be written to the first location 250 of the hypervisor memory 165. In an example, the guest state information saved in the register 177A may include an update or modification to the guest state. In an example, the hypervisor 160 may pass the value of the VCPU register 177A (e.g., update or modification to the guest state) saved in the first location 250 to a VM Function State Area 230 in the VMCS 220. In this way, the VM Function 192A may be able to access the changed state (e.g., changed VCPU state of the virtual machine function) normally because the change is now part of the VM Function state (e.g., the VCPU state of the VM Function 192A).

Then, the hypervisor 160 may load the saved state of the VM Function 192A from the first location 250 of the hypervisor memory 165 (block 420). In an example, the hypervisor 160 may load the state of the VM Function 192A by executing one or more write instructions (e.g., VMWRITE instructions) and then executing a resume instruction (e.g., VMRESUME instruction). In another example, the hypervisor 160 may load the state of the VM Function 192A by executing a launch instruction (e.g., VMLAUNCH instruction). In an example, the hypervisor 160 may overwrite the VM Function state in the VM Function State Area 230 with the VM Function state copy in the first location. In an example, the hypervisor 160 may load the state of the VM Function 192A by copying the state of the VM Function 192A from the first location 250 of the hypervisor memory 165 to the VMCS 220 (e.g. VM Function state area 230) first and then executing an instruction to load the state of the VM Function 192A from the VMCS 220. In an example, the hypervisor 160 may load the saved state of the VM Function 192A prior to switching to the VM Function 192A.

Then, the guest may request a switch to the VM Function 192A by executing a VM Function code (e.g., VMFUNC instruction) (block 422). Then, the VM Function 192A may be executed (block 424). In an example, rather than passing the guest state (e.g., update or modification) that needs to be passed to the VM Function 192A when switching, the hypervisor 160 may avoid over-writing that part of the guest state that needs to be passed to the VM Function 192A by using VMREAD/VMWRITE instructions. That is, the hypervisor 160 may skip the restoration of the updated/modified part of the guest state when switching. For example, when switching from the guest to the VM Function 192A, by executing a write instruction (e.g., VMWRITE instruction), the hypervisor 160 may skip the restoration of the guest state (e.g., updated VCPU state of the guest), and thus, the guest state may become part of the VM Function state (e.g., VCPU state of the VM Function 192A) after the switch.

In an example, the VM Function 192A may be switched back to the guest. Prior to switching back to the guest, the hypervisor 160 may save the current state of the VM Function 192A in the first location 250 of the hypervisor memory 165 (block 426). In an example, there may be a VM Function state that needs to be passed to the guest (e.g., modification or update to the VM Function state). Then, the hypervisor 160 may save this VM Function state in a register (e.g., VCPU register 177A). In an example, this register may be different from the register used to pass the guest state to the VM Function state. Then, the hypervisor 160 may pass the VM Function state to the guest, for example, by writing a value of the register to the hypervisor memory 165 prior to switching to the guest. That is, the value in the register regarding the VM Function may be written to a location in the hypervisor memory 165 having the guest state information. In this way, the VM Function state (e.g., updated/modified VCPU state of the VM Function 192A) may become part of the guest state (e.g., VCPU state of the guest).

In an example, the hypervisor 160 may pass the VM Function state, which needs to be passed to the guest, to a guest state area 240 in the VMCS 220. In this way, the guest may be able to access the changed state (e.g., changed VCPU state of the gest) normally because the change is now part of the VCPU state of the guest.

Then, the hypervisor 160 may load the saved state of the guest (e.g., guest OS 190A, guest firmware, and/or Applications 195A-B) from the second location 260 of the hypervisor memory 165 (block 428). In an example, the hypervisor 160 may load the guest state by executing one or more write instructions (e.g., VMWRITE instructions) and then executing a resume instruction (e.g., VMRESUME instruction). In another example, the hypervisor 160 may load the guest state by executing a launch instruction (e.g., VMLAUNCH instruction). In an example, the hypervisor 160 may load the guest state by copying the state of the guest from the hypervisor memory 165 (e.g., second location 260) to the VMCS 220 (e.g. guest state area 240) and then execute an instruction to load the guest state from the VMCS 220. In an example, the hypervisor 160 may load the saved state of the guest from the hypervisor memory 165 prior to switching to the guest. Then, the hypervisor 160 may switch to the guest from the VM function 192A (block 430). In an example, the hypervisor 160 may save the VM Function state and load the guest state after the completion of the execution of VM Function 192A. Accordingly, the guest may then be executed (block 432).

In an example, rather than passing the VM Function state (e.g., update or modification) that needs to be passed to the guest when switching, the hypervisor 160 may avoid over-writing that part of the VM Function state by using VMREAD/VMWRITE instructions. That is, the hypervisor 160 may skip the restoration of the updated/modified part of the VM Function state when switching. For example, when switching from the VM Function 192A to the guest, the hypervisor 160 may skip the restoration of the VM Function state (e.g., updated VCPU state of the VM Function 192A), and thus, the VM Function state may become part of the guest (e.g., VCPU state of the guest) after the switch.

Figure 5:
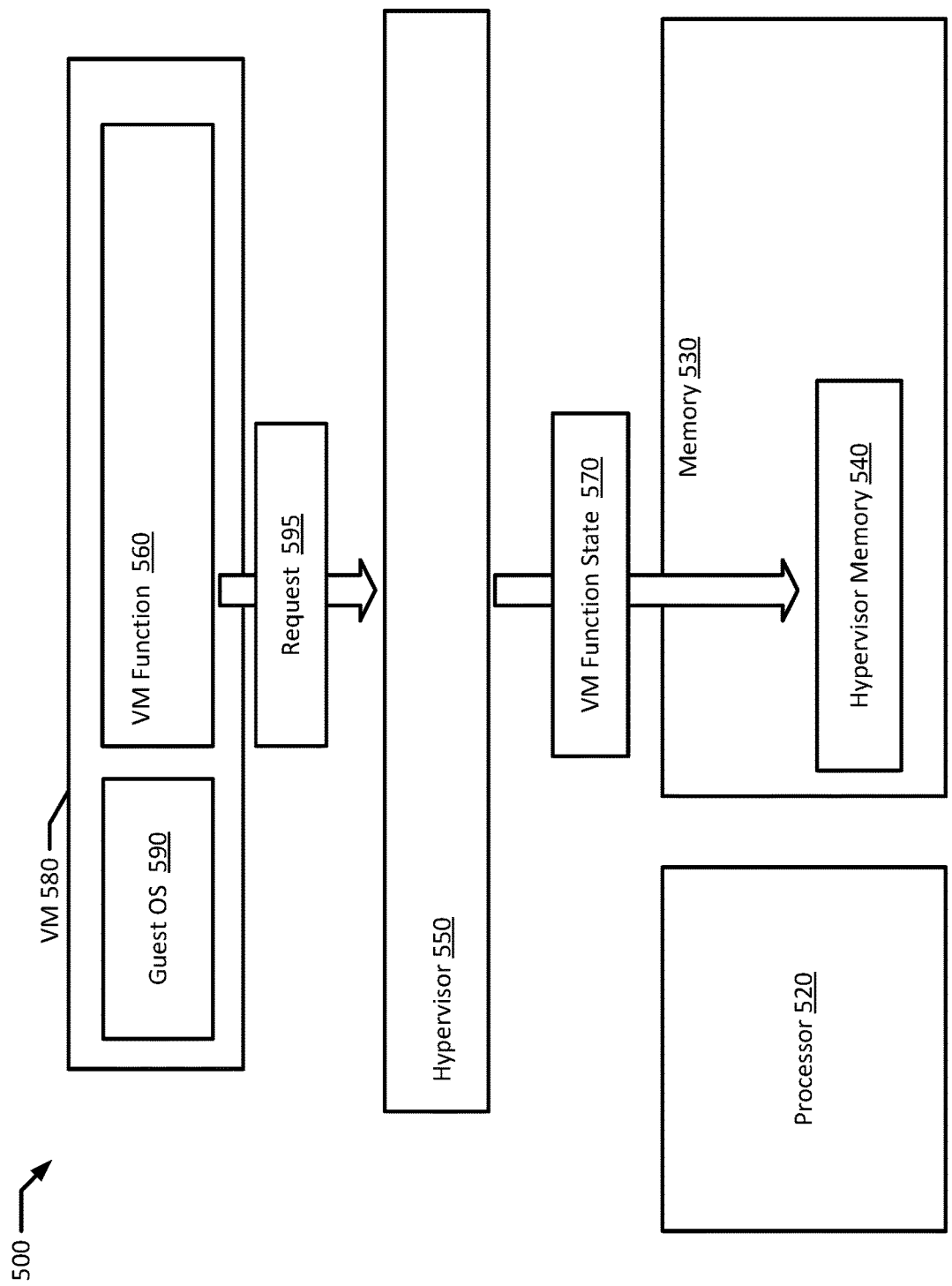
FIG. 5 is a block diagram of an example computer system according to an example of the present disclosure.

FIG. 5 shows a block diagram of an example system according to an example of the present disclosure. As illustrated in FIG. 5, an example system 500 may include a memory 530, one or more processors 520, in communication with the memory 530, a virtual machine 580 executing on the one or more processors 520, a virtual machine function 560 executing on the virtual machine 580, and a hypervisor 550 executing on the one or more processors 520. The hypervisor 550 may receive from the virtual machine function 560 a request 595 to save a virtual machine function state 570 in hypervisor memory 540. Then, the hypervisor 550 may save the virtual machine function state 570 in the hypervisor memory 540.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

The examples may be embodied in the form of computer-implemented processes and apparatuses for practicing those processes. An example may also be embodied in the form of a computer program code containing instructions embodied in tangible media, such as floppy diskettes, CD-ROMs, DVD-ROMs, hard drives, or any other computer readable non-transitory storage medium, wherein, when the computer program code is loaded into and executed by a computer, the computer becomes an apparatus for carrying out the method. An example may also be embodied in the form of computer program code, for example, whether stored in a storage medium, loaded into and/or executed by a computer, or transmitted over some transmission medium, such as over electrical wiring or cabling, through fiber optics, or via electromagnetic radiation, where when the computer program code is loaded into and executed by a computer, the computer becomes an apparatus for carrying out the method. When implemented on a general-purpose microprocessor, the computer program code segments configure the microprocessor to create specific logic circuits.

It should be understood that various changes and modifications to the examples described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A system comprising:
a memory;
one or more processors, in communication with the memory;
a virtual machine executing on the one or more processors; and
a hypervisor executing on the one or more processors;
wherein the one or more processors:
execute, by a guest on the virtual machine, virtual machine function set up code during initialization of the guest;
responsive to executing the virtual machine function set up code, set up a virtual machine function having initialization code and executing on the virtual machine, wherein the virtual machine function is implemented using extended page table switching, runs in a virtual machine function mode, and has access to resources, which are not available to the guest without invoking the virtual machine function;
responsive to setting up the virtual machine function, receive, by the hypervisor, from the virtual machine function, a request to save a virtual machine function state in hypervisor memory, the virtual machine function state including information about an extended page table for the virtual machine function;
responsive to the request, save, by the hypervisor, the virtual machine function state in the hypervisor memory; and
when the guest sends a request to the hypervisor to switch from the guest to the virtual machine function, save, by the hypervisor, a guest state to the hypervisor memory prior to switching from the guest to the virtual machine function, wherein the switching from the guest to the virtual machine function comprises switching from an extended page table for the guest to the extended page table for the virtual machine function.

2. The system of claim 1, wherein the hypervisor loads the virtual machine function state from the hypervisor memory.

3. The system of claim 2, wherein the virtual machine function state is loaded from the hypervisor memory prior to switching to the virtual machine function.

4. The system of claim 1, wherein the hypervisor switches to the virtual machine function.

5. The system of claim 1, wherein the hypervisor loads the guest state saved in the hypervisor memory prior to switching to the guest.

6. The system of claim 1, wherein the virtual machine function state includes a state of a register, wherein the register includes at least one of a control register and a general purpose register.

7. The system of claim 1, wherein the virtual machine function executes the initialization code in the virtual machine function.

8. The system of claim 7, wherein the initialization code includes virtual machine function save state code, wherein the virtual machine function save state code, when executed, causes a copy of the virtual machine function state to be saved in the hypervisor memory.

9. The system of claim 8, wherein the virtual machine function save state code, when executed, causes a copy of the virtual machine function state to be saved in the hypervisor memory by sending the request to the hypervisor, which causes the hypervisor to execute an instruction to ensure data corresponding to the virtual machine function state has been written to the hypervisor memory.

10. The system of claim 7, wherein the initialization code further includes guest save state code, wherein the guest save state code, when executed, causes the hypervisor to execute a read instruction to save a copy of the guest state in the hypervisor memory.

11. The system of claim 1, wherein the virtual machine function state is saved at a first location of the hypervisor memory and the guest state is saved at a second location of the hypervisor memory.

12. The system of claim 1, wherein the virtual machine function state is saved at a virtual machine control structure (VMCS) first and then a copy of the virtual machine function state is saved from the VMCS to the hypervisor memory.

13. The system of claim 1, wherein the hypervisor loads the virtual machine function state by copying the virtual machine function state from the hypervisor memory to a virtual machine control structure (VMCS) and then executing an instruction to load the virtual machine function state from the VMCS.

14. The system of claim 1, wherein the hypervisor loads the virtual machine function state by executing a write instruction and then executing a resume instruction.

15. The system of claim 1, wherein the hypervisor passes virtual machine function state information in a register from the virtual machine function to the guest by writing a value of the register to a second location of the hypervisor memory, where the guest state is saved, prior to switching to the guest.

16. The system of claim 1, wherein the hypervisor passes guest state information in a register from the guest to the virtual machine function by writing a value of the register to a first location of the hypervisor memory, where the virtual machine function state is saved, prior to switching to the virtual machine function.

17. The system of claim 1, wherein the hypervisor saves and loads a virtual machine state, wherein the virtual machine state includes a virtual CPU state.

18. A method comprising:
  executing, by a guest on a virtual machine, virtual machine function set up code during initialization of the guest;
  responsive to executing the virtual machine function set up code, setting up a virtual machine function having initialization code and executing on the virtual machine, wherein the virtual machine function is implemented using extended page table switching, runs in a virtual machine function mode, and has access to resources, which are not available to the guest without invoking the virtual machine function;
  responsive to setting up the virtual machine function, receiving, by a hypervisor, from the virtual machine function, a request to save a virtual machine function state in hypervisor memory, the virtual machine function state including information about an extended page table for the virtual machine function;
  responsive to the request, saving, by the hypervisor, the virtual machine function state in the hypervisor memory,
  when the guest sends a request to the hypervisor to switch from the guest to the virtual machine function, saving, by the hypervisor, a guest state to the hypervisor memory prior to switching from the guest to the virtual machine function, wherein the switching from the guest to the virtual machine function comprises switching from an extended page table for the guest to the extended page table for the virtual machine function.

19. The method of claim 18, further comprising passing, by the hypervisor, guest state information in a register from the guest to the virtual machine function by writing a value of the register to a first location of the hypervisor memory, where the virtual machine function state is saved, prior to switching to the virtual machine function.

20. A non-transitory machine readable medium storing instructions, which when executed by one or more processors in a computer system, cause the computer system to perform a method comprising:
  executing, by a guest on a virtual machine, virtual machine function set up code during initialization of the guest;
  responsive to executing the virtual machine function set up code, setting up a virtual machine function having initialization code and executing on the virtual machine, wherein the virtual machine function is implemented using extended page table switching, runs in a virtual machine function mode, and has access to resources, which are not available to the guest without invoking the virtual machine function;
  responsive to setting up the virtual machine function, receiving, by a hypervisor, from a virtual machine function, a request to save a virtual machine function state in hypervisor memory, the virtual machine function state including information about an extended page table for the virtual machine function;
  responsive to the request, saving, by the hypervisor, the virtual machine function state in the hypervisor memory, and
  when the guest sends a request to the hypervisor to switch from the guest to the virtual machine function, saving, by the hypervisor, a guest state to the hypervisor memory prior to switching from the guest to the virtual machine function, wherein the switching from the guest to the virtual machine function comprises switching from an extended page table for the guest to the extended page table for the virtual machine function.

\* \* \* \* \*